(12) United States Patent
Young

(10) Patent No.: US 6,587,221 B1
(45) Date of Patent: Jul. 1, 2003

(54) SCANNING DEVICE AND METHOD

(75) Inventor: Daniel L. Young, Palmyra, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/430,306

(22) Filed: Oct. 29, 1999

(51) Int. Cl.⁷ .......................... G06F 15/00; G06F 13/00
(52) U.S. Cl. .................. 358/1.2; 358/504; 358/518; 382/298; 382/299
(58) Field of Search .................... 358/1.2, 518, 504; 385/298, 299

(56) References Cited

U.S. PATENT DOCUMENTS

| | | | | | |
|---|---|---|---|---|---|
| 6,108,008 A | * | 8/2000 | Ohta | ........................ | 345/590 |
| 6,147,770 A | * | 11/2000 | Unishi et al. | ............... | 358/1.13 |
| 6,333,792 B1 | * | 12/2001 | Kimura | ....................... | 358/1.1 |
| 2002/0048413 A1 | * | 4/2002 | Kusunoki | ................... | 385/282 |

* cited by examiner

Primary Examiner—Edward Coles
Assistant Examiner—Alan Rahimi
(74) Attorney, Agent, or Firm—Oliff & Berridge PLC

(57) ABSTRACT

A scanning device comprises a controller that determines a resolution of an output image, for example the native resolution of a printer. The controller also determines a resolution of an input image based on the resolution of the output image, s that the definition of the input image is equal to the definition of the output image. The controller then controls the resolution of a scanner according to the resolution of the input image.

28 Claims, 12 Drawing Sheets

FIG. 4
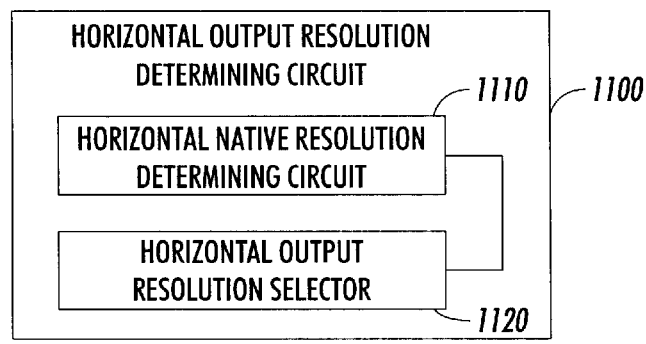
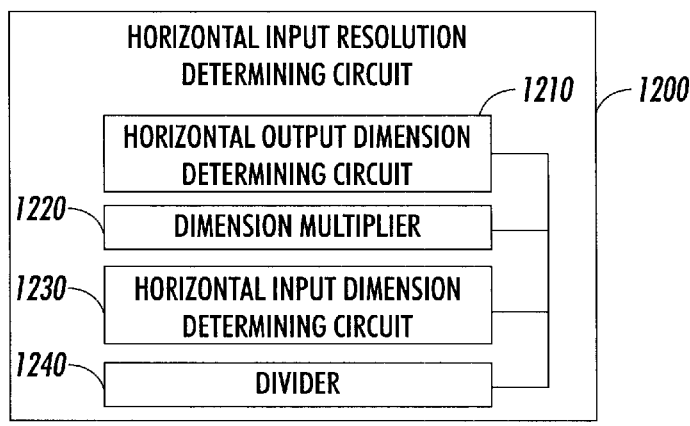
FIG. 5
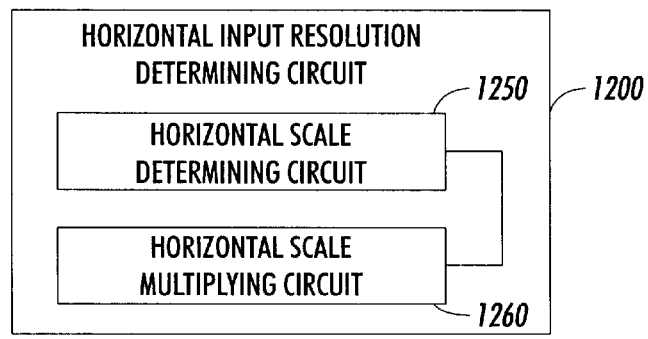
FIG. 6

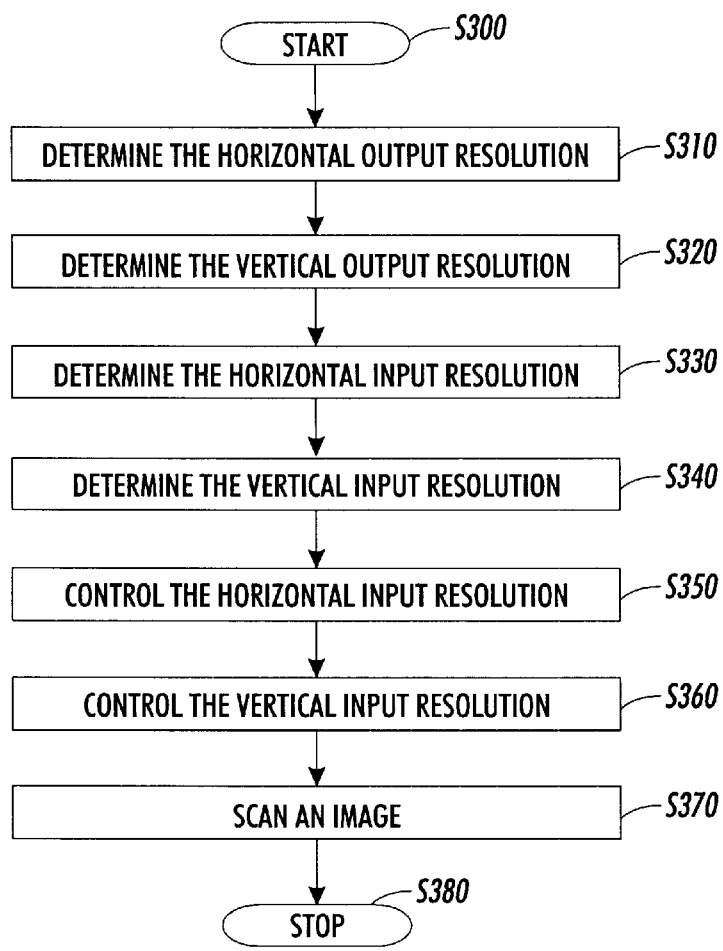

SCANNING DEVICE AND METHOD

BACKGROUND OF THE INVENTION

1. Field of Invention

This invention relates to scanning devices and methods.

2. Description of Related Art

In a carriage-type ink jet printer, the distance between nozzles in the printhead define the native vertical resolution of the printer. The minimum distance between two spots of ink deposited on the recording medium by the same nozzle define the native horizontal resolution of the printer. In a xerographic print engine, one or more data-modulated laser light beams scan over a xerographic photoreceptor in accordance with a predetermined raster scanning pattern. The minimum distance between two spots consecutively formed by the same laser light beam on the photoreceptor defines the native horizontal resolution of the printer. The distance between two scans on the photoreceptor by the same laser light beam define the native vertical resolution of the printer. More generally, any type of printer has a native horizontal resolution and a native vertical resolution.

Image scanning has assumed increased importance for applications such as desktop publishing, image processing and World Wide Web publication. Currently, image scanning is generally done using either high-end drum scanners or low-end flatbed scanners.

Images are represented in a wide variety of manners using various techniques. Illustratively, an image may be represented in the form of a grayscale image, i.e., a continuous tone image. In such a representation, multiple grayscale values are used to create the varying portions of the image. Such a grayscale image may be composed of pixels that possess values in the range of 0–255, for example, resulting in the image possessing 256 possible grayscale values.

Further, images may be represented in binary form. Illustratively, a continuous tone image may be converted or "halftoned" and represented in a binary form. In a binary form, an image is represented by creating halftone cells or dots. Each cell represents a grayscale value within an area of pixels. The pixels in the binary image may be either on or off, i.e., black or white, respectively. By turning the pixels in an area of the binary image on or off, a grayscale value may be simulated. As a result, the binary image can replicate the entire grayscale image without using continuous tones.

In particular, the binary image may be a high addressability binary image. A high addressability binary image is an image created by a device such that the spatial addressability of the writing spot is finer than the size of the writing spot. High addressability also often refers to an addressability resolution in a first direction is finer than the spatial addressability resolution in a second direction perpendicular to the first direction, for example.

SUMMARY OF THE INVENTION

Input scanners typically acquire image information possessing 256 levels of gray to represent a spot or pixel in the scanned image. In general, image output devices such as printers, for example, are only capable of creating spots within an area with a limited predetermined spatial resolution, based on the native horizontal and vertical resolutions. In contrast to the gray-scale resolution of a scanner, output devices generally use only two gray-scale levels, or some other relatively small number of levels, to reproduce image information. As a result, output devices commonly contend with excess gray-scale resolution information by quantizing the image data through halftoning techniques to represent the image as a halftone, i.e., a binary image possessing two grayscale levels.

When either one or both of the horizontal and vertical scanning resolutions is higher than the corresponding native resolution(s) of the target printer, the scanning process is less efficient because a higher speed and a smaller number of pixels could have achieved the same printing result.

Moreover, when a ratio between one of the horizontal and vertical resolutions of a scanner and the corresponding resolution of a printer is not a power of 2, moiré patterns can occur, which are detrimental to the accurate rendering of the image. Moire patterns are "beating", i.e., periodically mismatching, patterns of interference that degrade resulting rendered images.

Accordingly, there is a need in the art for a scanning method and device outputting an image to a print engine which allows for the printing characteristics of individual objects that are appropriate to the print engine, for example, with a vertical and horizontal resolutions that match the corresponding resolutions of a target printer, while simultaneously avoiding using large memory zones for each individual object.

According to one exemplary embodiment of this invention, an image scaling method utilizes the controllable scanner resolution with its segmentation and scaling intelligence to deliver a digital image scaled to a printer's native resolution.

These and other features and advantages of this invention are described in or are apparent from the following detailed description of the system and methods according to this invention.

BRIEF DESCRIPTION OF THE DRAWINGS

These and other objects of the present invention will be readily appreciated and understood from consideration of the following detailed description of exemplary embodiments of this invention, when taken together with the accompanying drawings, in which:

FIG. 4 is a block diagram showing in grater detail one exemplary embodiment of one horizontal output resolution determining circuit of FIG. 3;

FIG. 5 is a block diagram showing in grater detail a first exemplary embodiment of one horizontal input resolution determining circuit of FIG. 3;

FIG. 6 is a block diagram showing in grater detail a second other exemplary embodiment of one horizontal input resolution determining circuit of FIG. 3;

FIG. 13 is a flowchart outlining a second exemplary embodiment of the method according to this invention;

FIG. 14 is a flowchart outlining in greater detail one exemplary embodiment of one horizontal output resolution determination step of FIG. 13;

DETAILED DESCRIPTION OF PREFERRED EMBODIMENTS

Figure 1:
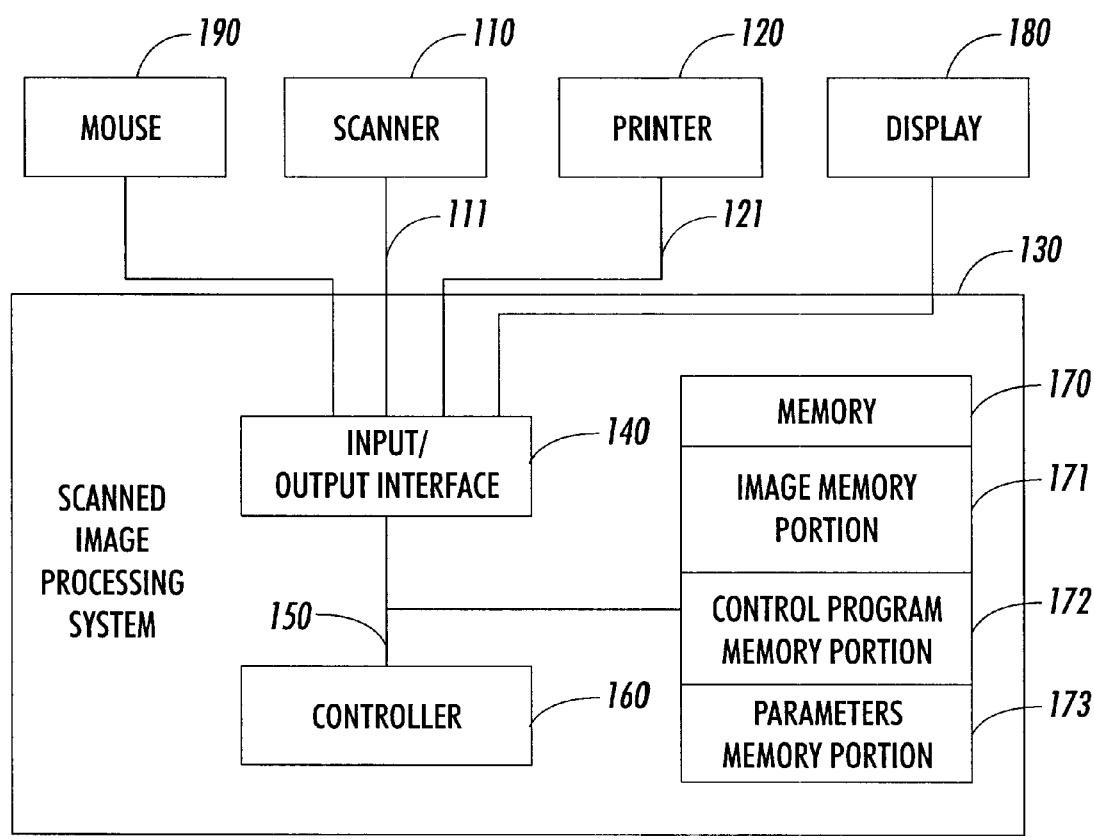
FIG. 1 is a schematic diagram showing one exemplary embodiment of a scanned image processing system according to this invention.

FIG. 1 is a schematic diagram showing one exemplary embodiment of a scanned image processing system 130 according to this invention. As shown in FIG. 1, a scanner 110 is connected to the scanned image processing system 130 over a link 111. Similarly, an image data sink 120 can be connected to the scanned image processing system 130 over a link 121.

It should be appreciated that the scanner 110 can be any known or later developed type of scanner. There is no restriction on the form the scanner 110 can take. However, when the scanner 110 is used in conjunction with the scanned image processing system 130 of this invention, the assumption is the scanner 110 is able to fully scan an entire original document. The scanned source documents can contain image regions, graphics regions, text regions or any other type of image data regions.

The link 111 can be any known or later developed device or system for connecting the scanner 110 to the scanned image processing system 130, including a direct cable connection, a connection over a wide area network or a local area network, a connection over an intranet, a connection over the Internet, or a connection over any other distributed processing network or system. In general, the link 111 can be any known or later developed connection system or structure usable to connect the scanner 110 to the scanned image processing system 130. Further, it should be appreciated that the link 111 can be a wired or wireless link to a network (not shown).

In the exemplary embodiment shown in FIG. 1, the image data sink 120 is a printer. However, in other exemplary embodiments, the image data sink is any known or later developed device that can receive an image from the scanned image processing system 130. Thus, the image data sink 120 can be a display, an image output terminal such as a laser printer, a digital copier, an ink-jet printer, a dot matrix printer, a dye sublimation printer, or the like. The image data sink can handle color image data or can be limited to images having a plurality of gray levels or even to black and white printers. The image data sink 120 can also be any known or later developed storage device, such as a floppy disk and drive, a hard disk and drive, a writeable CD-ROM or DVD disk and drive, flash memory, or the like. It should also be appreciated that the image data sink 120 can be located locally to the scanned image processing system 130 or can be located remotely from the scanned image processing system 130. Thus, like the link 111, the link 121 can be any known or later developed connection system or structure usable to connect the scanned image processing system 130 to the image data sink 120. Specifically, the link 121 can be implemented using any of the devices or systems described above with respect to the link 111.

The scanned image processing system 130 includes an input/output interface 140, a controller 160, a memory 170, all interconnected over a data and/or control signal bus 150. In addition, the scanner 10 and the image sink 120 are connected over the links 111 and 121, respectively, to the input/output interface 140. A display 180 and a mouse 190 are also connected to the input/output interface 140.

As shown in FIG. 1, the memory 170 includes an image memory portion 171, a parameters memory portion 173, and a control program memory portion 172. The image memory portion 171 stores the images obtained from the original document using the scanner 110 and transmitted to the scanned image processing system 130 over the link 111 and through the input/output interface 140. The parameters memory portion 173 stores the various operating parameters of the image data sink 120 and the scanner 110, such as the native maximum horizontal and the vertical resolutions, the number of colors used, the number of gray levels for each color, as described below.

The control program memory portion 172 stores any control programs of the scanned image processing system 130. In particular, the scanned image processing system 130 is preferably implemented using a programmed general purpose computer, microprocessor or microcontroller. Thus, the control program memory portion 172 stores the control programs to be executed by the controller 160 to implement the systems and methods of this invention.

As indicated above, the input/output interface 140, under control of the controller 160, inputs the images from the scanner 111 and stores them to the image memory portion 171. The input/output interface 140, also under control of the controller 160, can output the image from the memory 170 to the image data sink 120 over the signal line 121.

In operation, when the scanned image processing system 130 receives the images from the scanner 110, they are stored in the memory 170.

Figure 2:
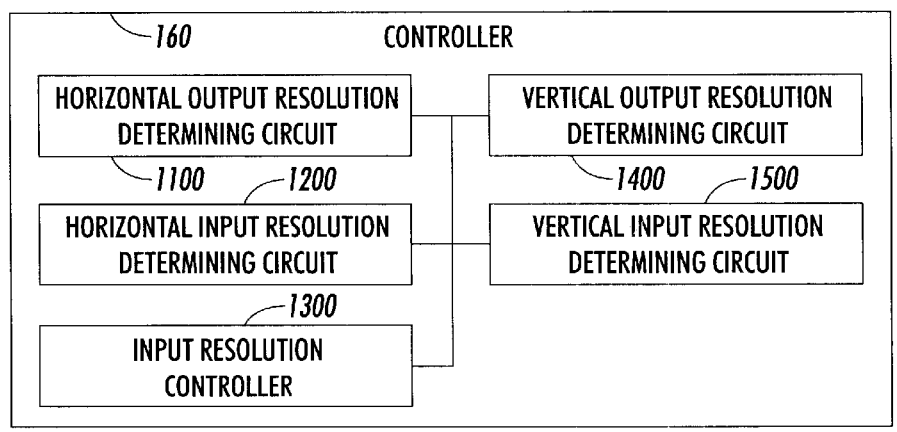
FIG. 2 is a block diagram showing in greater detail a first exemplary embodiment of one controller of the scanned image processing system shown in FIG. 1.

FIG. 2 is a block diagram showing in greater detail a first exemplary embodiment of the controller 160 of the scanned image processing system 130 shown in FIG. 1. In this first exemplary embodiment, the controller 160 comprises a horizontal output resolution determining circuit 1100, a horizontal input resolution determining circuit 1200, an input controller 1300, a vertical output resolution determining circuit 1400 and a vertical input resolution determining circuit 1500.

In operation, the horizontal output resolution determining circuit 1100 determines the horizontal output resolution of an output image. The horizontal input resolution determining circuit 1200 determines the horizontal input resolution of an input image based on the horizontal output resolution provided by the horizontal output resolution determining circuit 1100. Similarly, the vertical output resolution determining circuit 1400 determines the vertical output resolution of an output image. The vertical input resolution determining circuit 1500 determines the vertical input resolution of an input image based on the vertical output resolution provided by the vertical output resolution determining circuit 1400.

The input controller 1300 controls both the horizontal and the vertical input resolutions of the scanner 110 according to the horizontal and vertical input resolution provided by the horizontal input resolution determining circuit 1200 and vertical input resolution determining circuit 1500, respectively.

Figure 3:
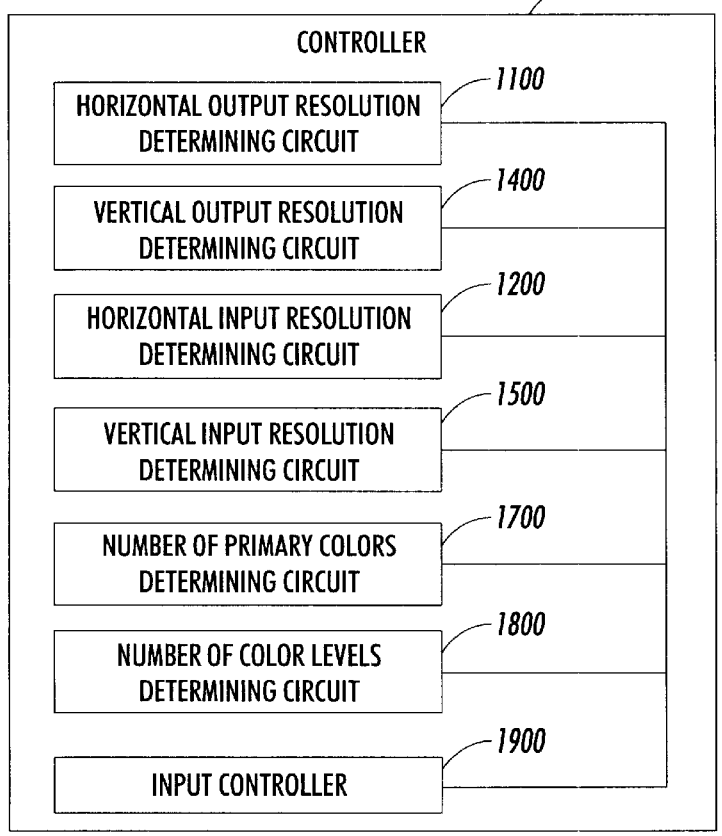
FIG. 3 is a block diagram showing in greater detail a second other exemplary embodiment of one controller of the scanned image processing system shown in FIG. 1.

FIG. 3 is a block diagram showing in greater detail a second exemplary embodiment of the controller 160 of the scanned image processing system 130 shown in FIG. 1. In this second exemplary embodiment, the controller 160 comprises the horizontal output resolution determining circuit 1100, the vertical output resolution determining circuit 1400, the horizontal input resolution determining circuit 1200, the vertical input resolution determining circuit 1500, a number of primary colors determining circuit 1700, a number of color levels determining circuit 1800 and an input controller 1900.

As in the first exemplary embodiment of the controller 160, the horizontal input resolution determining circuit 1200 determines the horizontal input resolution of an input image based on the horizontal output resolution provided by the horizontal output resolution determining circuit 1100. Similarly, the vertical input resolution determining circuit 1500 determines the vertical input resolution of an input image based on the vertical output resolution provided by the vertical output resolution determining circuit 1400. The input controller 1900 controls the horizontal and vertical input resolutions of the scanner 110 according to the horizontal and vertical input resolutions respectively provided by the horizontal and vertical input resolution determining circuits 1200 and 1500.

FIG. 4 is a block diagram showing in greater detail one exemplary embodiment of the horizontal output resolution determining circuit 1100. This exemplary embodiment of the horizontal output resolution determining circuit 1100 comprises a native horizontal resolution determining circuit 1110 and a horizontal output resolution selector 1120. The horizontal native resolution determining circuit 1110 determines the horizontal native resolutions of an output device, such as, for example, the printer 120 in the exemplary embodiment shown in FIG. 1. The horizontal output resolution selector 1120 is used to select an output horizontal resolution less than or equal to the horizontal native output resolution provided by the horizontal native resolution determining circuit 1110. The horizontal output resolution selector 1120, is, for example, a printer driver graphic user interface comprising a window displayed by the display 180, in which a user can select printing parameters.

FIG. 5 is a block diagram showing in greater detail a first exemplary embodiment of the horizontal input resolution determining circuit 1200. This exemplary embodiment of the horizontal input resolution determining circuit 1200 comprises a horizontal output dimension determining circuit 1210, a dimension multiplier 1220, a horizontal input dimension determining circuit 1230 and a divider 1240. The horizontal output dimension determining circuit 1210 determines a horizontal output dimension of the output image. The dimension multiplier 1220 multiplies the horizontal output resolution of the output image by the horizontal dimension of the output image to obtain the output horizontal definition. The horizontal input dimension determining circuit 1230 determines the input horizontal dimension of the input image. The divider 1240 divides the horizontal output horizontal definition by the horizontal dimension to obtain the horizontal input resolution.

The horizontal input resolution determining circuit 1200 shown in FIG. 5 determines the input horizontal resolution so that the horizontal output definition and the horizontal input definition are equal. In the same way, the vertical input resolution determining circuit 1500 can determine the input vertical resolution so that the vertical output definition and the vertical input definition are equal. However, in other embodiments of the device of this invention, the input resolutions are determined so that the ratio of at least one output definition and least one input definition is constant.

FIG. 6 is a block diagram showing in greater detail a second exemplary embodiment of the horizontal input resolution determining circuit 1200. In this second exemplary embodiment, the horizontal input resolution determining circuit 1200 comprises a horizontal scale determining circuit 1250 and a horizontal scale multiplier 1260.

The horizontal scale determining circuit 1250 determines the horizontal scale of the output image with respect to the input image. The horizontal scale is the ratio of the output horizontal size of the output image by the corresponding size of the input image. The horizontal scale multiplier 1260 multiplies the horizontal output resolution provided by the horizontal output resolution determining circuit 1100 by the horizontal scale to determine the input horizontal resolution.

It should be appreciated that the vertical input resolution determining circuit 1500 can include circuits similar to those of the horizontal input resolution determining circuit 1200 shown in FIG. 5 and 6.

Figure 7:
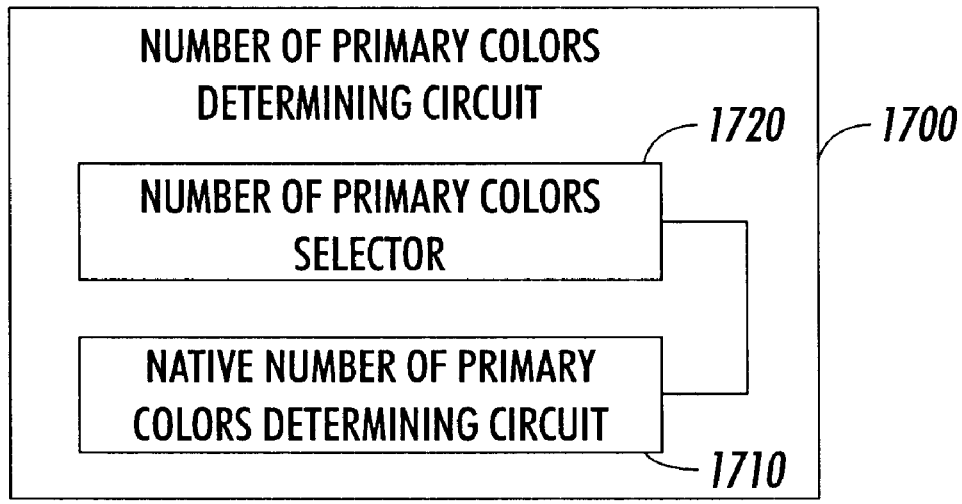
FIG. 7 is a block diagram showing in grater detail one exemplary embodiment of one primary colors number determining circuit of FIG. 3.

FIG. 7 is a block diagram showing in greater detail one exemplary embodiment of the number of primary colors determining circuit 1700. This exemplary embodiment of the number of primary colors determining circuit 1700 comprises a native number of primary colors determining circuit 1710 and a number of primary colors selector 1720. The number of primary colors determining circuit 1700 determines a number colors to be output and a number of input primary colors, based on the number of output primary colors. The input controller 1900 controls the number of primary colors scanned by the scanner based on the number of input primary colors determined by the number of primary colors determining circuit 1700. The native number of output primary colors determining circuit 1710 determines the native number of output primary colors of an output device, such as, for example, the printer 120 in the exemplary embodiment shown in FIG. 1. The number of primary colors selector 1720 is used to select a number of primary colors to be output. The number of primary colors selector 1720, is, for example, a printer driver graphic user interface, i.e., a window displayed by the display 180 in which a user can select printing parameters.

Figure 8:
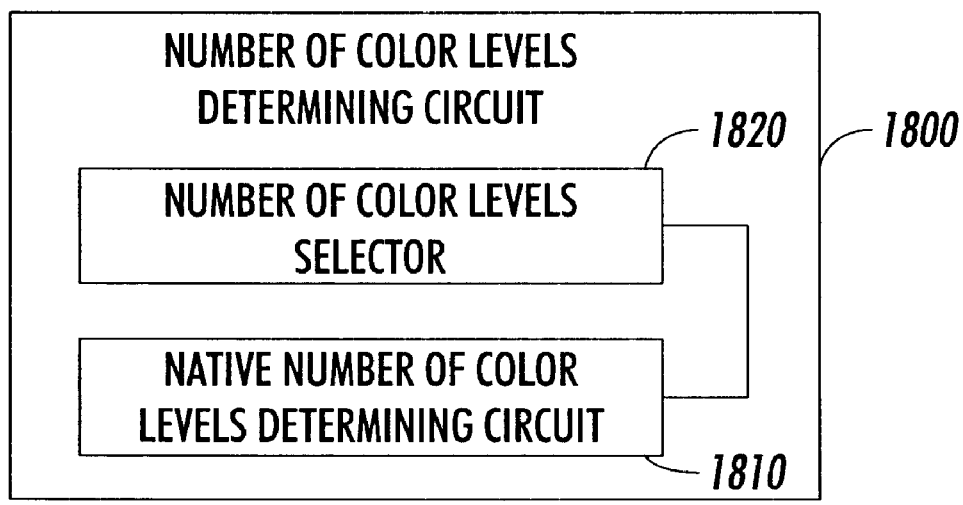
FIG. 8 is a block diagram showing in grater detail one exemplary embodiment of one color level number determining circuit of FIG. 3.

FIG. 8 is a block diagram showing in greater detail one exemplary embodiment of the number of color levels determining circuit 1800. This exemplary embodiment of the number of color levels determining circuit 1800 comprises a native number of color levels determining circuit 1810 and a number of color levels selector 1820. The number of color levels determining circuit 1800 determines a number color levels to be output and a number of input color levels, based on the number of output color levels. The input controller 1900 controls the number of color levels scanned by the scanner based on the number of input color levels provided by the number of input color levels determined by the number of color levels determining circuit 1800. The native number of output color levels determining circuit 1810 determines the native number of output color levels of an output device, such as, for example, the printer 120 in the exemplary embodiment shown in FIG. 1. The number of color levels selector 1820 is used to select a number of color levels to be output. The number of color levels selector 1820, is, for example, a printer driver graphic user interface, i.e., a window displayed by the display 180 in which a user can select printing parameters.

As shown in FIGS. 1–8, the scanned image processing system 130 is preferably implemented on a programmed general purpose computer. However, the scanned image processing system 130 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing one of the flowcharts shown in FIGS. 12–19, can be used to implement the scanned image processing system 130. Alternatively, each of the circuits shown in FIGS. 1–8 can be implemented as physically distinct hardware circuits within an ASIC, or using a FPGA, a PDL, a PLA or a PAL, or using discrete logic elements or discrete circuit elements. The particular form each of the circuits shown in FIGS. 1–8 will take is a design choice and will be obvious and predicable to those skilled in the art.

As shown in FIG. 1, the alterable portions of the memory 170 are preferably implemented using static or dynamic RAM. However, the alterable portions of the memory 170 can also be implemented using a floppy disk and disk drive, a writeable optical disk and disk drive, a hard drive, flash memory or the like.

As shown in FIG. 1, the non-volatile portions of the memory 170 is preferably implemented using a ROM. However, the non-volatile portions of the memory 170 can also be implemented using flash memory, CMOS memory, a PROM, an EEPROM, or a CD-ROM and disk drive or the like.

Figure 9:
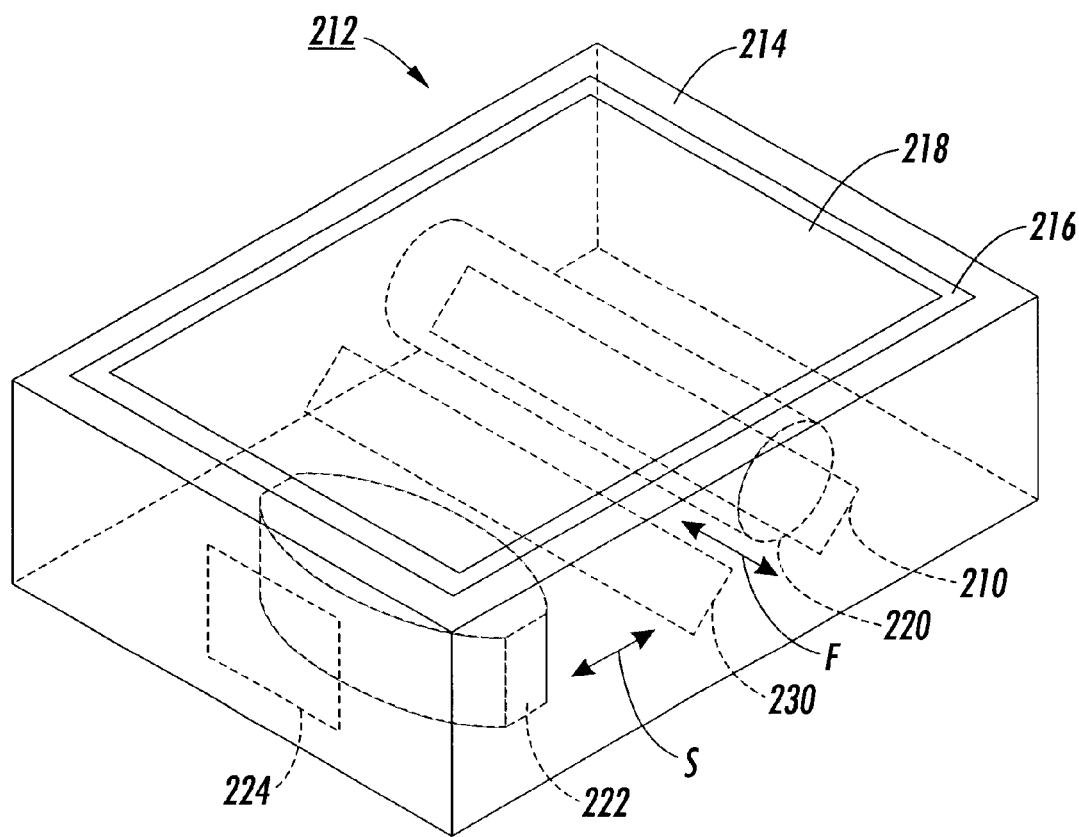
FIG. 9 is a partial perspective view of one scanner of the scanned image processing system shown in FIG. 1.

FIG. 9 is a partial perspective view of a scanner of the scanned image processing system shown in FIG. 1. Conventional scanners allow a computer to convert text, a drawing or a photograph into digital information so that a graphics or desktop publishing program can use the digital information to display the image of the text, drawing or photograph onto a display screen or to reproduce the image with a graphics printer. Some conventional scanners distinguish between only black and white colors, which can be useful for text or line art. More sophisticated scanners can differentiate between shades of gray. Even more sophisticated scanners can differentiate among colors and use red, blue and green filters and/or light sources to detect the colors in the scanned document.

Black-and-white and gray-shading scanning requires only one pass of a scan head in a slow scanning direction adjacent the scanned document. For a conventional multi-pass color scanner, the document is scanned multiple times, and each time the illumination on the document is filtered or illuminated to pass a different color region of the light onto the document and, in turn, onto the image sensing detectors. For a conventional single-pass color scanner, the red, green and blue image sensing pixels in the image sensing detector use red, green and blue color filters or light sources.

In one exemplary embodiment, the document is illuminated with white light, i.e., the various spectral regions corresponding to red, green and blue which are intermixed at the source of the illumination. The light is reflected off the document and imaged onto light-sensitive detectors. These detectors are often referred to as photodiode arrays or "charge coupled devices" or "CCDs".

An exemplary embodiment of a scanner device 212 is illustrated in FIG. 9. One of ordinary skill in the art should appreciate that the scanner device 212 is a flatbed scanner. Other types of scanners usable with this invention include sheet-fed scanners, such as a facsimile machine, and a hand-held scanner. Furthermore, a skilled artisan should appreciate that the scanner device 212 is used for illustrative purposes only and that other components commonly known in the industry required for proper scanning operations are not shown.

In FIG. 9, the scanner device 212 includes a housing 214 having a transparent plate 216 extending along a top portion of the housing 214. The transparent plate 216 supports a document 218 to be scanned. The document 218 can include text, drawings, photographs or the like. Additionally, the document 218 can be either a black and white document or a multi-colored document.

Internally, the scanner device 212 includes an illuminator apparatus 210, a rod lens 220, a convex lens 222, a mirror 230 and a light sensitive detector 224. For the flatbed scanner device 212 shown in FIG. 9, the illuminator: apparatus 210 and the rod lens 220 are incorporated into a scan head (not shown) that moves in a slow scanning direction indicated by arrow S. One of ordinary skill in the art would appreciate that the scanning operation also occurs in a fast scanning direction indicated by arrow F. A conventional electric cord (not shown) carries electrical power to the scanner device 212 for performing scanning operations.

Figure 10:
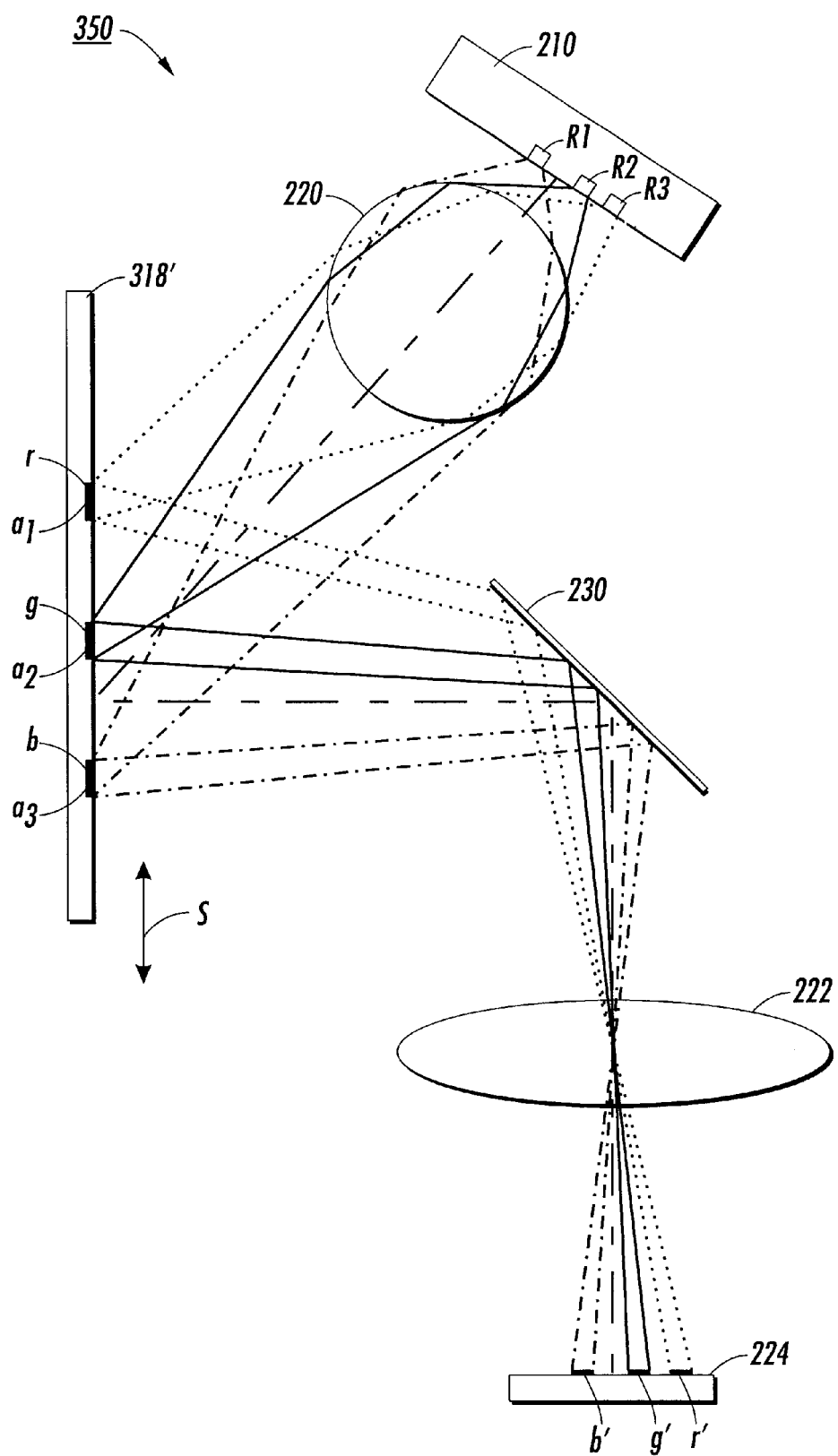
FIG. 10 is a schematic cross-section of optical components of the scanner shown on FIG. 9.
Figure 11:
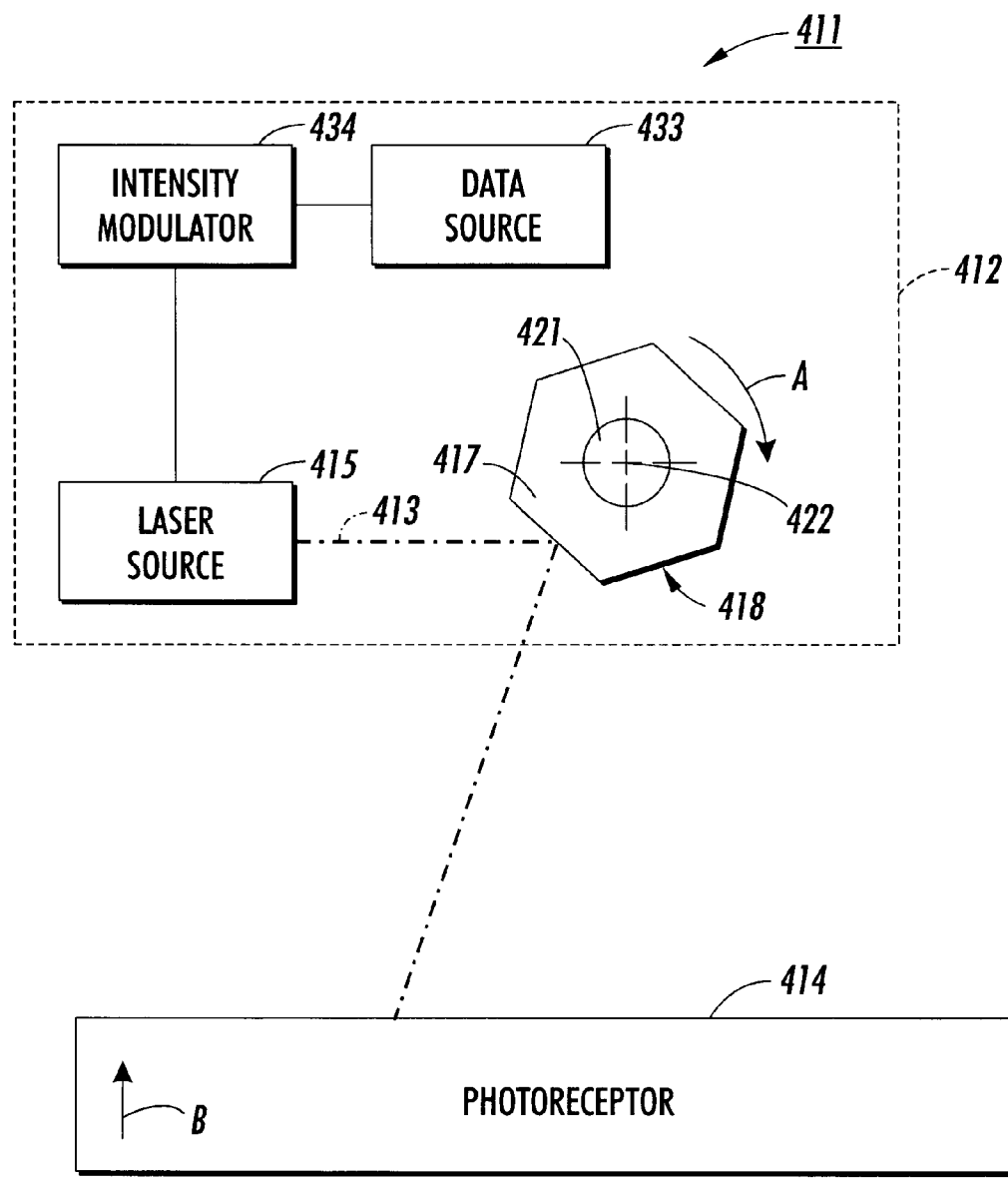
FIG. 11 is a schematic cross-sectional view of one xerographic printer of the scanned image processing system shown in FIG. 1.

A color image sensor apparatus 350 is schematically illustrated in FIGS. 10 and 11. This color image sensor apparatus 350 may be used for scanning a multi-colored document 318'. The color image sensor apparatus 350 includes the illuminator apparatus 210, the rod lens 220, the mirror 230, the convex lens 222 and the light-sensitive detector 224. As discussed above, the illuminator apparatus 210 has three rows of light emitting elements, with each row including a plurality of differently-colored light emitting elements. The illuminator apparatus 210 projects blue colored light, green colored light and red colored light onto the multi-colored document 318'. The blue, green and red colored lights extend across the multi-colored document 318' in the fast scanning direction F.

The rod (or intermediate) lens 220 is positioned between the illuminator apparatus 210 and the multi-colored document 318' and relays the blue, green and red colored lines of light projected from the illuminator apparatus 210 onto the multicolored document 318'. These blue, green and red lines are labeled b, g and r, respectively. The convex lens 222 receives the blue, green and red lines of light reflected from the multi-colored document 318' after a reflection on the mirror 230 and focuses the reflected lines onto the light-sensitive detector 224. The light-sensitive detector 224 receives the focused blue, green and red colored rows of light labeled as b', g'and r', respectively. The focused blue, green and red colored lines of light b', g'and r'are then converted by the light-sensitive detector 224 into respective electrical signals. The light-sensitive detector 224 can be one of many different types. For example, a trilinear color line scan sensor such as the one used in the Dalsa CL-G1-2098G color line scan camera could be used. This camera is described on pages 197 to 206 in 1994 Dalsa Inc. Databook published by Dalsa Inc. of Waterloo, Ontario, Canada. In such a sensing device, the rows of red, green and blue sensors are separated by 112 microns, and the spacing of the color separated illumination on the document would be increased by an amount determined by the demagnification of the imaging system.

The light-sensitive detector more typically would be one in which there is a greater separation between the rows of red, green and blue sensors. This occurs naturally in the case of a conventional trilinear time delay and integration (TDI) image sensors. Because the TDI image sensors use multiple stages for each color channel, the image sensing surfaces for each color channel are wider than for line scan sensors. TDI image sensors are therefore able to sense light originating from a correspondingly wider portion of document surface in the slow scan direction.

FIG. 11 shows a xerographic print engine 411 having a generally conventionally configured raster output scanner 412. The raster output scanner 412 scans one or more data-modulated light beams 413 over a xerographic photo-receptor 414 in accordance with a predetermined raster scanning pattern. The raster output scanner 412 comprises a laser 415 and a polygon scanner 417. The laser 415 emits the one or more light beams 413 at a visible or invisible frequency, such as an infrared frequency. The rotating polygon scanner 417 has a plurality of nearly identical, mirror-like exterior sidewalls or facets 418.

A motor 421 rotates the polygon scanner 417 about a central axis 422, as indicated by the arrow A, at a substantially constant angular velocity. The polygon scanner 417 is positioned between the laser 415 and the photoreceptor 414. The rotation of the polygon scanner 417 scans the one or more laser beams 413 across the photoreceptor 414 in a fast scan direction. The photoreceptor 414, on the other hand, is simultaneously advanced in an orthogonal process, or slow scan, direction at a substantially constant linear velocity, as indicated by the arrow B. Accordingly, the one or more laser beams 413 scan the photoreceptor 414 in accordance with a raster scan pattern. As shown in FIG. 11, the photoreceptor 414 is coated on a rotating drum 424. However, the photoreceptor 414 also could be carried by a belt or any other suitable substrate.

Typically, the raster output scanner 412 brings the one or more laser beams 413 to a generally circular focus proximate the photoreceptor 414 and provides any optical correction that may be needed to compensate for scanner wobble, off-axis impingement of the one or more laser beams 413 and other optical irregularities. Preferably, the optical aperture of the raster output scanner 412 is sufficiently large to avoid excessively truncating the one or more laser beams 413. Accordingly, the one or more laser beams 413 are placed into a generally circular or elliptical focus with a gaussian intensity profile.

The raster output scanner 412 also includes a data source 433 that provides image data and an intensity modulator 434 that modulates the intensity of the laser beams produced by the laser diode 424 temporally and spatially modulating the laser beam based on information provided by the data source 433.

The method of this invention is designed to instruct an image scanner interface driver to scale (i.e., to reduce or to enlarge) raster images targeted for resolution dependent printers. That is, the method of this invention reduces or enlarges dimensions of scanned image to be rendered upon the printing device in accordance with the printer resolution and the size of the image to be printed.

The resolution of the scanned image as rendered at the printing device remains constant, while the dimensions of the scanned image are scaled by a reduction/enlargement parameter.

To achieve this goal, the image scanner interface driver is modified to programmatically scale a region. In an exemplary embodiment of the methods according to this invention, an Image Scanner Interface Specification ISIS (trademark of Pixel Translations, Inc.) is used.

Currently, without the extensions to the ISIS specification according to this invention, as discussed below, the ISIS specification defines scaling through an ISIS scanner driver by adjusting the current resolution and holding the dimensions constant. In ISIS, the values for the dimensions of width and length are specified in pixels. Furthermore, dimensions are always established by direct modification, and are never modified indirectly. Thus, when a scaled image is then targeted to and rendered upon a printer whose native resolution is constant, the actual size of the printed image remains unchanged from that of, or is directly proportional to that of the original.

For example, an 8.5"×11" document is to be scanned at 300 pixels/inch (or dots/inch) and doubled in size. Expressed in pixels, the width of the scanned image of the original document is equal to 8.5 inches, i.e., the width expressed in inches, times 300 pixels/inch, i.e., the resolution of the scanner, or 2450 pixels. Identically, expressed in pixels, the length of the scanned image of the original document is 11 inches times 300 pixels/inch, or is 3300 pixels. Expressed in inches, the width of the double-size printed image is 8.5 inches×2, or 17 inches and the length is equal to 11 inches×2, or 22 inches.

By applying the definition for scaling as outlined above, to output a double-size (17×22) printed image, expressed in pixels, the width and the length of the resulting image remain unchanged, that is 2,450 and 3,300 pixels, respectively. The horizontal resolution of the 17 inch horizontal printed image is 2450 pixels/17 inches, or 150 pixels/inch. Similarly, the vertical resolution is 3,300 pixels/22 inches =150 pixels/inch.

This means that, in each direction, the resolution of the output image is inversely proportional to its size. While the original dimensions expressed in pixels remained unchanged, the dimensions when expressed in inches double in size and the resolutions are divided by 2.

According to the extension of the ISIS specification according to the systems and methods of this invention, scaling can be requested programmatically through the tags TAG_SCAN_SCALE_X and TAG_SCAN_SCALE_Y. In one exemplary embodiment of the extensions of the ISIS specification according to this invention, setting the X value changes the Y value, but setting the Y value is independent of the X value. So, to set both X and Y to maintain aspect ratio, only the X value needs to be set. To distort the aspect ratio, the X value should be set first. Then the Y value should be set. The SCALE tags take values of type RAT, i.e., rational, for example ⅔.

In contrast, in the exemplary embodiments of the methods according to this invention, scaling is performed through an ISIS scanner driver by adjusting the current dimensions and holding the resolution constant.

Thus, when a scaled image is targeted to and rendered upon a printer whose native resolution is constant, the actual size of the printed image is directly proportional to that of the original image.

For example, if the native resolution of the printer is 300 pixels/inch in each direction, to print a double-size image at 300 pixels/inch requires scanning the image at 600 pixels/inch. By applying the definition for scaling as outlined in this invention, for a 17×22 inch output image, expressed in pixels, the width of the original image is equal to 17 inches times 300 pixels/inch, or 5,100 pixels. Similarly, expressed in pixels, the length of the printed image is 22 inches times 300 pixels per inch, or 6,600 pixels.

When printed upon a 300 pixels/inch printer, the actual size of the scaled 17"×22 image rendered at 300 pixels/inch, expressed in pixels, is twice that of the original 8,5"×11" rendered at 300 pixels/inch.

The horizontal resolution of the scanned original image is thus 5,100 pixels/8,5 inches, or 600 pixels/inch. Similarly, the vertical resolution of the scanned image is equal to 6,600 pixels/11 inches, or 600 pixels/inch.

In another exemplary embodiment where the native horizontal resolution of the printer is 300 pixels/inch and the native vertical resolution of the printer is 200 pixels/inch, to print a double-size image at the native resolution, requires, a horizontal resolution of the scanned image equal of 600 pixels/inch and a vertical resolution of the scanned image of 400 pixels/inch.

In the general operation of this exemplary embodiment of the scanning device of this invention, the user selects a printer on witch an image to be scanned will be printed. The user also selects a printed image size and the number of primary colors of the printed image. Then, printing parameters, including the native horizontal resolution of the selected printer, the native vertical resolution of the selected printer, the number of primary colors that the printer is able to print and the number of different color levels that the printer is able to print for each primary colors, are manually or automatically determined.

A preview of the page to be scanned is then given to the user, by scanning the whole image with an intermediate resolution and by displaying the scanned image. The user then selects the whole image or a portion of the image by selecting the upper left corner and the lower right corner of the selected portion of the scanned page.

The vertical scanner resolution is selected to be equal to the vertical printer resolution, multiplied by the vertical size of the printed image, and divided by the vertical size of the page to be scanned. The horizontal scanner resolution is selected to be equal to the horizontal printer resolution, multiplied by the horizontal size of the printed image, and divided by the horizontal size of the page to be scanned.

The number of primary colors to be scanned is selected to be equal to the number of primary colors to be printed. The number of bits per pixel for each primary color to be scanned is selected to be equal to the number of bits corresponding to the number of color levels that the printer is able to print.

The image is then scanned by the scanner with the selected scanning parameters, horizontal and vertical resolutions, number of colors and number of bits per pixel. If the image is to be immediately printed, the image is printed with the selected printing parameters.

Specifically, in one exemplary embodiment of the scanning device 130 as shown in FIG. 1, the controller 160 first receives from the user an identifier of a selected printer 120 on which an image to be scanned will be printed. The controller 160 also receives an information representing the printed image size and the number of primary colors of the printed image selected by the user. Then, the controller 160 determines a plurality of printing parameters, including the native horizontal resolution of the selected printer 120, the native vertical resolution of the selected printer 120, the number of primary colors that the printer 120 is able to print and the number of different color levels that the printer 120 is able to print for each primary colors. Each of these printing parameters is given to the controller 160 by a driver of the printer 120.

Then a preview of the page to be scanned is given to the user, by scanning the whole image with an intermediate resolution, using the scanner 110, and by displaying the scanned image on the display device 180. Then, the controller 160 receives from the user information representing the selected portion of the image which the user desires to print. In one exemplary embodiment, this information is given by the user using the mouse 190, and represents the upper left corner and the lower right corner of the selected portion.

The controller 160 then selects the vertical scanner resolution to be equal to the vertical printer resolution, multiplied by the vertical size of the printed image, and divided by the vertical size of the page to be scanned. The controller 160 also selects the horizontal scanner resolution to be equal to the horizontal printer resolution, multiplied by the horizontal size of the printed image, and divided by the horizontal size of the page to be scanned. The controller 160 selects the number of primary colors to be scanned to be equal to the number of primary colors to be printed. The controller 160 selects the number of bits per pixel for each primary color to be scanned to be equal to the number of bits corresponding to the number of color levels that the printer 120 is able to print.

The driver of the scanner 110 is instructed by the controller 160 of the scanning parameters, including horizontal and vertical resolutions, number of colors and number of bits per pixel. The scanner 110 then scans the image with the scanning parameters set by the controller 160. The scanned image is stored in the image memory portion 171.

The controller 160 then determines whether the stored image is to be printed immediately. If so, the controller sends the stored image to the printer 120, to be printed with the printing parameters selected by the user, such as the size of the image and the number of primary colors, or given by the printer driver, such as the native resolutions and the number of color levels.

If no other image is to be scanned, the controller 160 then stops the operations of scanning images.

Figure 12:
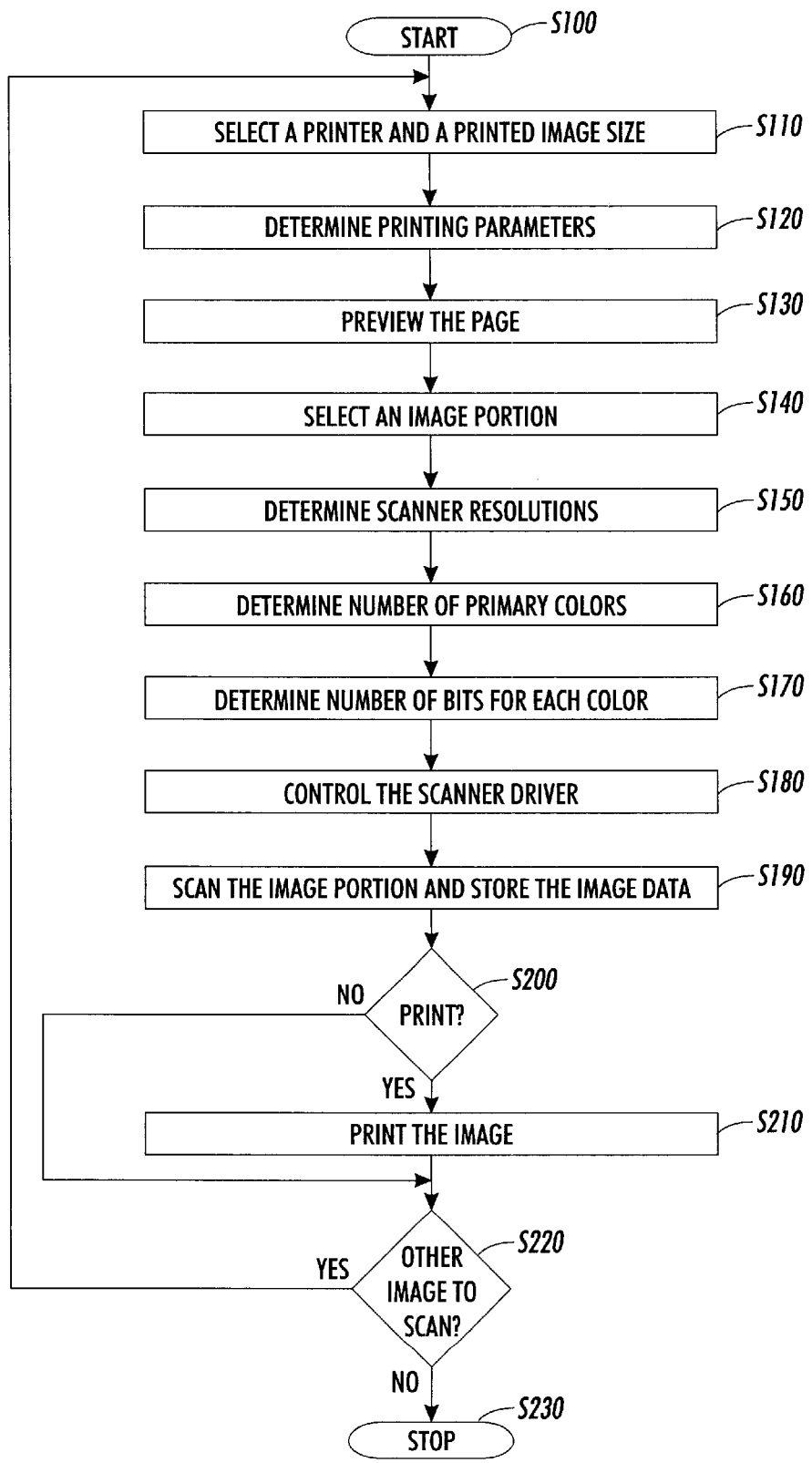
FIG. 12 is a flowchart outlining a first exemplary embodiment of the method according to this invention.

FIG. 12 is a flowchart outlining a first exemplary embodiment of the methods according to this invention. Beginning in step S100, control continues to step S110, where the user selects a printer on which an image to be scanned will be printed. In step S110, the user also selects a printed image size and the number of primary colors of the printed image. Then, in step S120, printing parameters, including the native horizontal resolution of the selected printer, the native vertical resolution of the selected printer, the number of primary colors that the printer is able to print and the number of different color levels that the printer is able to print for each primary colors are determined. Next, in step S130, a preview of the page to be scanned is displayed to the user, by scanning the whole image with an intermediate resolution and by displaying the scanned image to the user. Control then continues to step S140.

In step S140, the user selects the whole image or a portion of the image. In one exemplary embodiment of step S170, the user selects the upper left corner and the lower right corner of the selected portion using selection device, such as a mouse in conjunction with the displayed scanned image. Next, in step S150, the vertical scanner resolution is selected to be equal to the vertical printer resolution, multiplied by the vertical size of the printed image, and divided by the vertical size of the image to be scanned. Also in step S150, the horizontal scanner resolution is selected to equal to the horizontal printer resolution, multiplied by the horizontal size of the printed image, and divided by the horizontal size of the image to be scanned. Then, in step S160, the number of primary colors to be scanned is set to be equal to the number of primary colors to be printed. Control then continues to step S170.

In step S170, the number of bits per pixel for each primary color to be scanned is set to be equal to the number of bits corresponding to the number of color levels that the printer is able to print. Then, in step S180, the scanning parameters are provided to the scanner driver. Next, in step S190, the image is scanned with the scanning parameters, including horizontal and vertical resolutions, number of colors and number of bits per pixel. Control then continues to step S200.

In step S200 a determination is made whether the image is to be printed immediately. If so, control continues to step S210. Otherwise, control jumps directly to step S220. In step S210, the image is printed with the printing parameters selected by the user, such as the size of the image and the number of primary colors, or with the printing parameters given by the printer driver, such as the native resolutions and the number of color levels. Control then continues to step S220. In step S220, a determination is made whether another image is to be scanned. If so, control continues to step S110. Otherwise, control continues to step S230, where the process stops.

FIG. 13 is a flowchart outlining a second exemplary embodiment of the methods according to this invention. Beginning in step S300, control continues to step S310, where the horizontal output resolution of an output image is determined. Then, in step S320, a vertical output resolution of an output image is determined. Next, in step S330 a horizontal input resolution of an input image is determined based on the horizontal output resolution. Control then continues to step S340.

In step S340, a vertical input resolution of an input image is determined based on the vertical output resolution. Next, in step S350, the horizontal input resolution of a scanner is controlled according to the horizontal input resolution determined in step S330. Then, in step S360 the vertical input resolution of a scanner is controlled according to the vertical input resolution determined in step S340. Control then continues to step S370.

In step S370, a scanned image is input. Then, in step S380, the process stops.

FIG. 14 is a flowchart outlining in greater one exemplary embodiment of step S310 of FIG. 13. As shown in FIG. 14, beginning in step S310, control continues to step S312, where the horizontal native resolution of an output device is determined. Then, in step S314, a horizontal output resolution less than or equal to the horizontal native resolution is selected. Next, in step S316, control returns to step S320.

Figure 15:
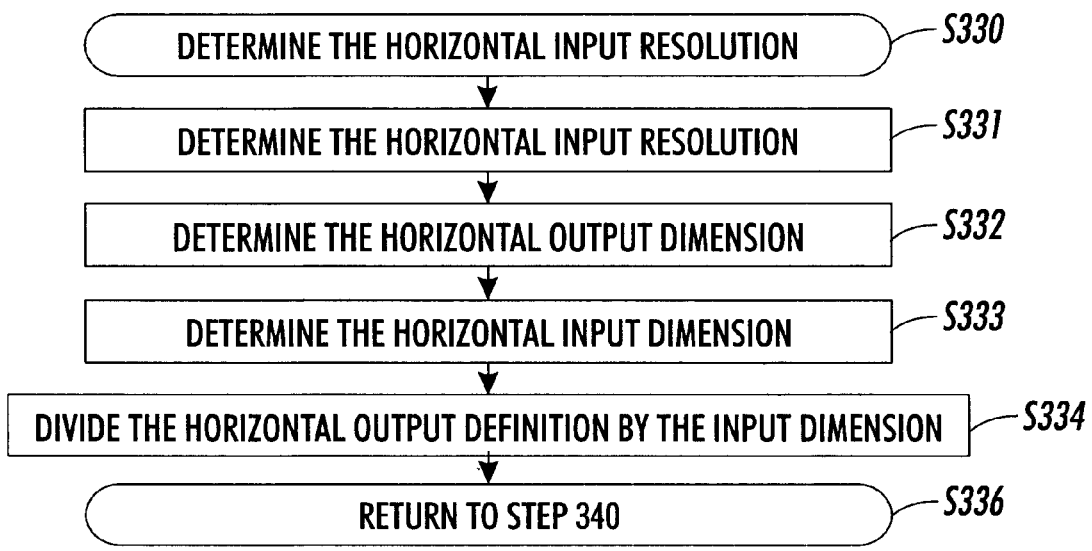
FIG. 15 is a flowchart outlining in greater detail a first exemplary embodiment of one horizontal input resolution determination step of FIG. 13.

FIG. 15 is a flowchart outlining in greater detail a first exemplary embodiment of step S330 of FIG. 13. Beginning in step S330, control continues to step S331, where a horizontal output dimension of an output image is determined. Next, in step S332, the horizontal output resolution is multiplied by the horizontal output dimension to obtain the horizontal output definition. Then, in step S333, a horizontal input dimension of an input image is determined. Control then continues to step S334.

In step S334, the horizontal output definition is divided by the horizontal input dimension to obtain the horizontal input resolution. Then, in step S336, control returns to step S340.

In this first exemplary embodiment of step S330, as shown in FIG. 15, the horizontal input resolution is determined so that the horizontal output definition and the horizontal input definition are equal. In the same way, the vertical input resolution can be determined so that the vertical output definition and the vertical input definition are equal.

Figure 16:
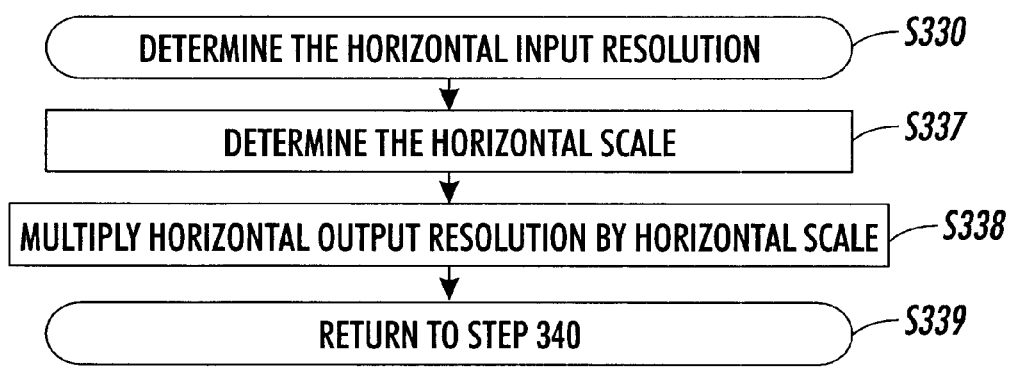
FIG. 16 is a flowchart outlining in greater detail a second exemplary embodiment of one horizontal input resolution determination step of FIG. 13.

FIG. 16 is a flowchart outlining in greater detail a second exemplary embodiment of step S330 of FIG. 13. In this exemplary embodiment, beginning in step S330, control continues to step S337, where the horizontal scale of the output image with respect to the input image is determined. Then, in step S338, the horizontal output resolution is multiplied by the horizontal scale to obtain the horizontal input resolution. Next, in step S339, control returns to step S340.

In the second exemplary embodiment of step S330, as shown in FIG. 16, the input resolutions are determined so that at least one output definition and at least one input definition are equal. However, in other exemplary embodiments of the methods of this invention, the input resolutions are determined so that the ratio of at least one output definition and least one input definition is constant.

Figure 17:
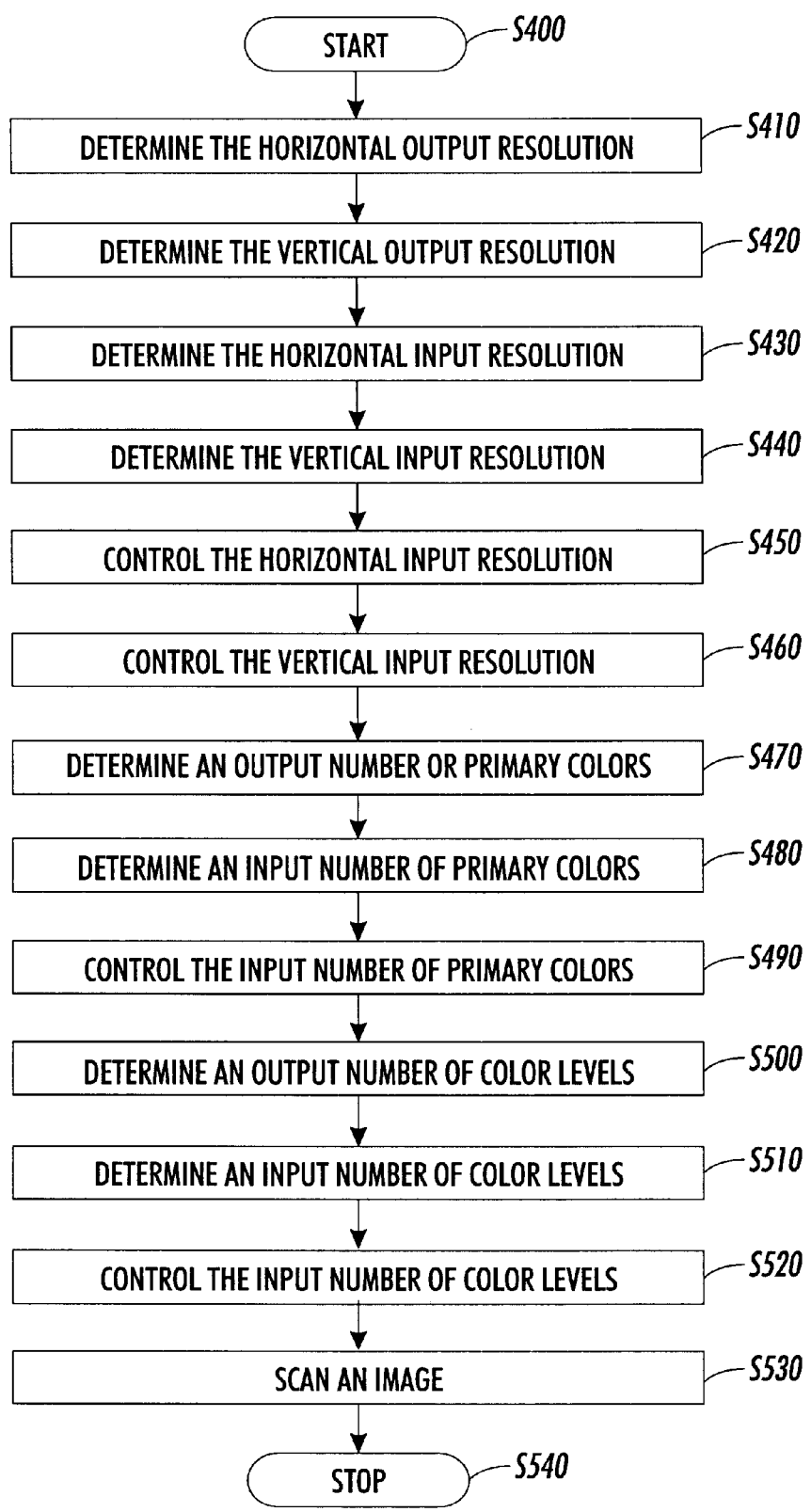
FIG. 17 is a flowchart outlining a third exemplary embodiment of the method according to this invention.

FIG. 17 is a flowchart outlining a third exemplary embodiment of the methods according to this invention. In this third exemplary embodiment, beginning in step S400, control continues to step S410, where the horizontal output resolution of an output image is determined. Then, in step S420 a vertical output resolution of an output image is determined. Next, in step S430, a horizontal input resolution of an input image is determined based on the horizontal output resolution. Control then continues to step S440.

In step S440, a vertical input resolution of an input image is determined based on the vertical output resolution. Next, in step S450, the horizontal input resolution of a scanner is controlled according to the horizontal input resolution determined in step S430. Then, in step S460, the vertical input resolution of a scanner is controlled according to the vertical input resolution determined in step S440. It should be appreciated that steps S410 to S460 can respectively be similar to steps S310 to S360 of the second embodiment. Control then continues to step S470. In step S470, a number of output primary colors to be output is determined. Then, in step S480, a number of input primary colors is determined based on the number of output primary colors. Next, in step S490, the number of primary colors scanned by the scanner is controlled based on the number of input primary colors. Control then continues to step S500. In step S500, a number of output color levels to be output is determined. Next, in step S510, a number of input color levels is determined based on the number of output color levels. Then, in step S520, the number of color levels scanned by the scanner is controlled based on the number of input color levels. Next, in step s530, a scanned image is input. Control then continues to step S540, where the process stops.

Figure 18:
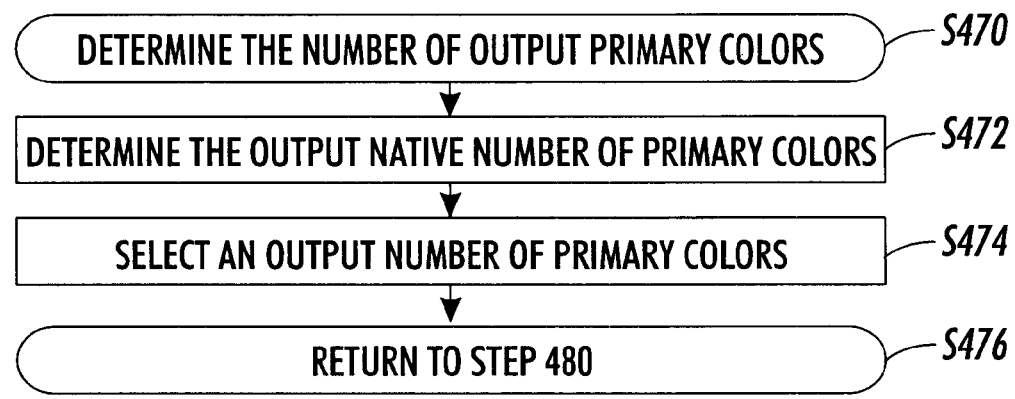
FIG. 18 is a flowchart outlining in greater detail one exemplary embodiment of one primary color number determination step of FIG. 17.

FIG. 18 is a flowchart outlining in greater detail one exemplary embodiment of step S470 of FIG. 17. In this exemplary embodiment, beginning is step S470, control continues to step S472, where the native number of primary colors of an output device is determined. Then, in step S474, a number of output primary colors less than or equal to the native number of primary colors of the output device is selected. Control then continues to step S476, where control returns to step S480.

Figure 19:
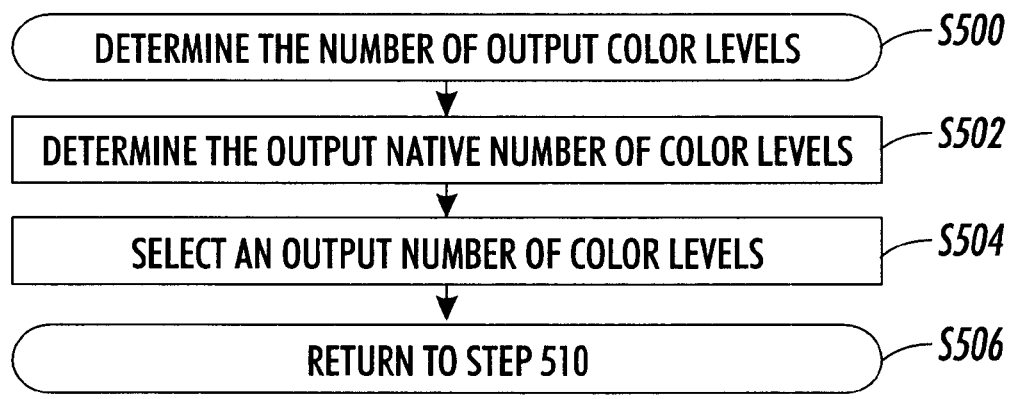
FIG. 19 is a flowchart outlining in greater detail one exemplary embodiment of one color level number determination step of FIG. 17.

FIG. 19 is a flowchart outlining in greater detail one exemplary embodiment of step S500 of FIG. 17. In this exemplary embodiment, beginning in step S500, control continues to step S502, where the native number of color levels of an output device is determined. Next, in step S504, a number of output color levels less than or equal to the native number of color levels of the output device is selected. Control then continues to step S506, where control returns to step S510.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A scanning device that generates image data, comprising:
    an output resolution determining circuit that determines at least one output resolution from one of a vertical output resolution and a horizontal output resolution of an output image;
    an output dimension determining circuit that determines at least one output dimension of an output image;
    at least one dimensions multiplier that multiplies the at least one output resolution by the at least one output dimension to obtain at least one output definition;
    an input resolution determining circuit that determines at least one input resolution from one of a vertical input resolution and a horizontal input resolution of an input image based on the at least one output definition by dividing the at least one output definition by an input dimension of an image to be scanned; and
    an input controller that controls at least one input resolution of a scanner according to the at least one input resolution.

2. The scanning device of claim 1, wherein the input resolution determining circuit comprises:
    an input dimension determining circuit that determines at least one input dimension of an input image, and
    a divider that divides the at least one output definition by at least one input dimension to obtain the at least one input resolution.

3. The scanning device of claim 1, wherein the input resolution determining circuit determines at least one input resolution so that at least one output definition and at least one input definition are equal.

4. The scanning device of claim 1, further comprising scale determining circuit that determines at least one scale of the output image with respect to the input image.

5. The scanning device of claim 4, wherein the input resolution determining circuit comprises at least one scale multiplier that multiplies at least one output resolution by at least one scale to determine the at least one input resolution.

6. The scanning device of claim 1, wherein the output resolution determining circuit comprises at least one native resolution determining circuit that determines at least one native resolution of an output device.

7. The scanning device of claim 1, wherein the output resolution determining circuit comprises a output resolution selector with which a user can select at least one output resolution.

8. The scanning device of claim 1, further including
    number of output primary colors determining circuits that determines a number colors to be output,
    number of input primary colors determining circuit that determines the number of input primary colors, based on the number of output primary colors, wherein the input controller further controls the number of primary colors scanned by the scanner based on the number of input primary colors.

9. The scanning device of claim 8, wherein the number of output primary colors determining circuit comprises a native number of output primary colors determining circuit that determines a native number of output primary colors of an output device.

10. The scanning device of claim 8, wherein the number of output primary colors determining circuit comprises a number of primary colors selector with which a user select a number of primary colors.

11. The scanning device of claim 1, further including
    number of output color levels determining circuits that determines a number color levels to be output,
    number of input color levels determining circuit that determines the number of input color levels, based on the number of output color levels, wherein the input controller further controls the number of color levels scanned by the scanner based on the number of input color levels.

12. The scanning device of claim 11, wherein the number of output color levels determining circuit comprises a native number of output color levels determining circuit that determines a native number of output color levels of an output device.

13. The scanning device of claim 11, wherein the number of output color levels determining circuit comprises a number of color levels selector with which a user select a number of color levels.

14. The scanning device of claim 1, wherein the input resolution determining circuit determines at least one input resolution so that the ratio between at least one output definition and at least one input definition is constant.

15. A scanning method for generating image data, comprising:
    determining at least one output resolution from one of a vertical output resolution and a horizontal output resolution of an output image;
    determining at least one output dimension of an output image;
    multiplying the at least one output resolution by the at least one output dimension to obtain at least one output definition;
    determining at least one input resolution from one of a vertical input resolution and a horizontal input resolution of an input image based on the at least one output definition by dividing the at least one output definition by an input dimension of an image to be scanned; and
    controlling at least one input resolution of a scanner according to the at least one input resolution.

16. The scanning method of claim 15, wherein determining at least one input resolution comprises:
    determining at least one input dimension of an input image, and dividing the at least one output definition by the at least one input dimension to obtain the at least one input resolution.

17. The scanning method of claim 15, wherein the input resolution is determined so that at least one output definition and at least one input definition are equal.

18. The scanning method of claim 15, further comprising determining at least one scale of the output image with respect to the input image.

19. The scanning method of claim 18, wherein determining the at least one input resolution determines the at least one input resolution as equal to the at least one an output resolution multiplied by the at least one scale.

20. The scanning method claim 15, wherein determining the output resolution determines the at least one output resolution as equal to at least one native resolution of an output device.

21. The scanning method of claim 15, wherein determining the at least one output resolution comprises selecting the at least one output resolution.

22. The scanning method of claim 15, further including
   determining a number of output primary colors to be output,
   determining a number of input primary colors based on the number of output primary colors, and
   controlling the number of primary colors scanned by the scanner based on the number of input primary colors.

23. The scanning method of claim 22, wherein determining the number of output primary colors comprises determining a native number of primary colors of an output device.

24. The scanning method of claim 22, wherein determining the number of output primary colors comprises selecting a number of primary colors.

25. The scanning method of claim 15, further including
   determining a number of output color levels to be output,
   determining a number of input color levels based on the number of output color levels, and
   controlling the number of color levels scanned by the scanner based on the number of input color levels.

26. The scanning method of claim 25, wherein determining the number of output color levels comprises determining a native number of color levels of an output device.

27. The scanning method of claim 25, wherein determining the number of output color levels comprises selecting a number of color levels.

28. The scanning method of claim 15, wherein the input resolution is determined so that the ratio between at least one output definition and at least one input definition is constant.

* * * * *